(12) United States Patent
Johnson et al.

(10) Patent No.: US 10,509,692 B2
(45) Date of Patent: Dec. 17, 2019

(54) LOOSELY-COUPLED LOCK-STEP CHAINING

(71) Applicant: 2236008 Ontario Inc., Waterloo (CA)

(72) Inventors: Kerry Wayne Johnson, Ottawa (CA); Christopher William Lewis Hobbs, Ottawa (CA); Peter Shook, Ottawa (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 170 days.

(21) Appl. No.: 15/610,139

(22) Filed: May 31, 2017

(65) Prior Publication Data

US 2018/0349214 A1 Dec. 6, 2018

(51) Int. Cl.
*G06F 11/16* (2006.01)
*G06F 9/54* (2006.01)

(52) U.S. Cl.
CPC .......... *G06F 9/546* (2013.01); *G06F 11/1629* (2013.01); *G06F 11/1695* (2013.01)

(58) Field of Classification Search
CPC .................................................. G06F 11/1658
USPC ........................................................ 714/11, 12
See application file for complete search history.

(56) References Cited

U.S. PATENT DOCUMENTS

| | | | | |
|---|---|---|---|---|
| 6,897,772 | B1* | 5/2005 | Scheffler | G08B 3/10 340/3.1 |
| 2006/0212677 | A1* | 9/2006 | Fossum | G06F 1/3237 712/1 |
| 2006/0248322 | A1* | 11/2006 | Southgate | G06F 11/1641 712/244 |
| 2007/0043491 | A1 | 2/2007 | Goerick et al. | |
| 2007/0150118 | A1 | 6/2007 | Takamatsu et al. | |
| 2008/0141534 | A1* | 6/2008 | Hilliard | A61C 7/02 29/896.11 |
| 2008/0222453 | A1* | 9/2008 | Bartz | G06F 11/3636 714/28 |
| 2013/0197736 | A1 | 8/2013 | Zhu et al. | |
| 2016/0232063 | A1* | 8/2016 | Das | G06F 3/0619 |
| 2017/0139411 | A1 | 5/2017 | Hartung et al. | |

(Continued)

FOREIGN PATENT DOCUMENTS

EP 2594446 5/2013

OTHER PUBLICATIONS

PCT International Search Report and Written Opinion of the International Searching Authority, relating to application No. PCT/CA2018/050611, dated Aug. 13, 2018.

(Continued)

*Primary Examiner* — Chae M Ko
(74) *Attorney, Agent, or Firm* — Rowand LLP (57) ABSTRACT

A system and method enables loosely-coupled lock-step computing including sensors that detect or measure a physical property and server groups. Each server group is serially linked to another server group and includes server instances operating in virtual synchrony. Virtual synchrony middleware receives outputs from multiple server instances and renders a single reply based on the outputs from the multiple server instances. The virtual synchrony middleware replicates and orders incoming requests to the server groups to ensure each of the server instances of that server group receives the same incoming requests in the same order.

25 Claims, 6 Drawing Sheets

(56) References Cited

U.S. PATENT DOCUMENTS

2018/0321305 A1* 11/2018 Stafford ............. G01R 31/2856

OTHER PUBLICATIONS

Hobbs, C. Software Defences Against Hardware Failure, 6th Scandinavian Conference on System & Software Safety, Stockholm, Sweden, 2018, 20 pages, May 20, 2018, retrieved from: http://safety.addalot.se/upload/2018/SCSSS18_ChrisHobbs.pdf *whole document*.

Jeffery, C.M. et al, A Flexible Approach to Improving System Reliability with Virtual Lockstep, IEEE Transactions on Dependable and Secure Computing, vol. 9, No. 1, pp. 2-15, Jan./Feb. 2012.

Birman, K.P. et al., Exploiting Virtual Synchrony in Distributed Systems, Proceedings of the eleventh ACM Symposium on Operating System Principles, SOSP '87, Nov. 8-11, 1987, Austin, Texas, USA, pp. 123-138, Nov. 11, 1987, Retrieved from: http://www.cs.cornell.edu/home/rve/sys/p123-birman.pdf.

\* cited by examiner

LOOSELY-COUPLED LOCK-STEP CHAINING

BACKGROUND OF THE DISCLOSURE

1. Technical Field

This disclosure relates to the control of sequentially joined devices and specifically to a loosely-coupled lock-step distributed architecture.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

DETAILED DESCRIPTION

Most systems in use today are not as sophisticated or as complex as the fully self-driving vehicle technology now in development. Today's systems use sensors and software to detect and manage only limited automotive functions such controlling a vehicle's speed through a cruise control. An autonomous cruise control automatically adjusts vehicle speed to maintain a safe driving distance between a vehicle and the vehicles ahead of it. These systems use integrated hardware having large track widths and slow clock rates, which to a large extent is very reliable due to its limited functionality.

Fully self-driving vehicle technology will handle almost all of the driving, from door-to-door when it becomes viable. This means that multiple controllers, software modules, and sensors will be needed to provide mobility, safety, and meet safety certifications. These systems must be able to detect vehicles, identify roadwork, cyclists and the motions associated with them. The systems must predict the future behavior of these objects that make up the driving environment and must react safely to unexpected changes that can happen very quickly.

To meet such a demanding task, fully autonomous self-driving vehicle technology and other fully or semi-autonomous systems that may be completely unrelated to it will require more functionality from its software and hardware. The technology will require the use of several processors, which will work end-to-end to implement and execute very sophisticated controls. However, at the hardware level, the microprocessors are running at higher clock speeds and the track widths are dramatically decreasing, making the processors and memory devices needed for these sophisticated controls more susceptible to failure and more susceptible to electromagnetic interference damage, cross-talk damage, thermal aging damage, etc.

This disclosure provides a Loosely-Coupled Locked-Step (LCLS) chain architecture that is reliable, scalable, and available when needed. The LCLS architecture makes use of fault-tolerant servers that run the same set of operations in parallel. The servers start in the same state, and receive the same messages in the same order, such that the servers eventually arrive at the same state. The architecture supports data driven, demand driven, and/or hybrid data flows (e.g., data driven and demand driven flows) that can be tailored to an embedded system's needs. Embedded systems are those systems that are integral to, or a unitary part of, another system or process, such as a vehicle, a medical device, or a nuclear power station, or a railway signaling system or a train, for example. The LCLS architecture makes use of replication and diversification in a distributed environment that can be run on multiple processors some or all of which may be safety certified. The LCLS architecture supports requestors and responders in the self-supporting distributed network in which the components can be classified based on what component initiates an interaction. A component is either sending data or information in response to a request it receives first (e.g., making it a responder component) or demanding data or information first (e.g., making it a requestor component). Generally, a client is a process, program, task, or hardware that requests data or information or services. It processes data or information or services without having to "know" any of the working details of the program or hardware servicing it; and, it makes use of a network service on behalf of a user. Generally, a server is a process, program, task, or hardware that responds to one or more client requests. It may itself be a client of some other server. It need not "know" any of the working details of the program or hardware requesting its services.

Some LCLS architectures apply virtual synchrony to provide resilience against systematic and random errors that can give rise to different failures. These failures may become detectable much later in a processing thread than when the failures first occur. Virtual synchrony is guided by two underlying principles. First, when a server joins a group, it receives a copy of the server group's state. The first instance joining a group effectively creates a group. Further, memberships can change, making group membership dynamic. While a server instance can, for load-sharing purposes, request details from a number of its members and its sequence number within a group, the server instances need not be aware of other server instances or members in its group or groups if a member of many groups. And further, each client requesting a service from the server group may believe it is communicating with only a single server not the two or more server instances it actually is. The second underlying principle of virtual synchrony is that each server in the server group will receive exactly the same messages in exactly the same order from each client. This does not mean or require that messages from two different clients be delivered in the same order to each group member. It merely requires that the same messages be received in exactly the same order from each particular client or client group if operating in replication. Further, the required message order does not require that the order be predetermined; it can occur dynamically. If any group member agrees to receive a message m1 before a message m2 from clients, then all members in the group will receive m1 and m2 messages in that order.

Figure 1:
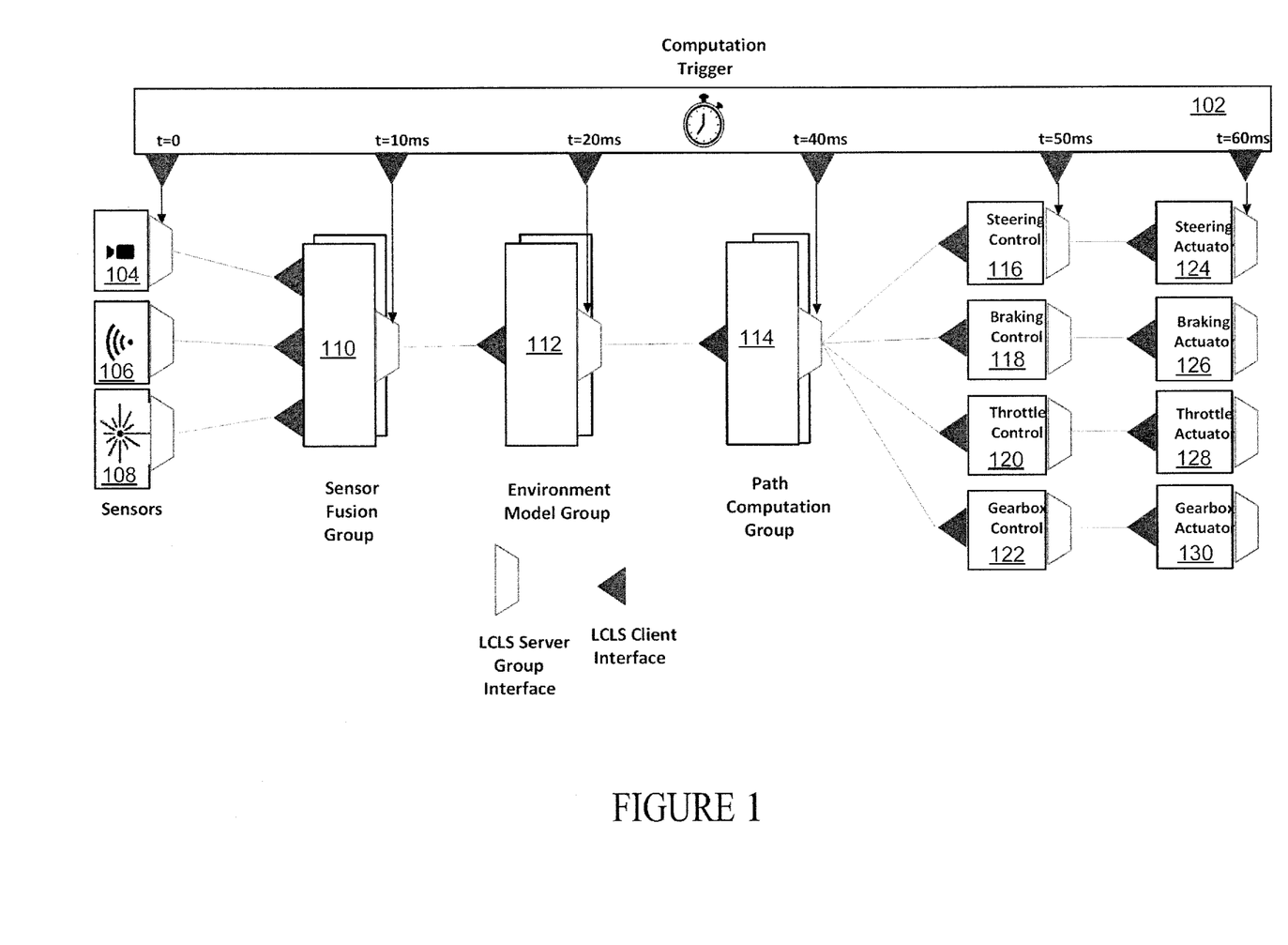
FIG. 1 is a synchronous loosely-coupled lock-step chain architecture that is demand driven.

FIG. 1 is a synchronous loosely-coupled lock-step chain architecture that is demand driven. In this synchronous pull architecture, the responder nodes compute results based on the computation trigger, buffer the data, and then wait for the request from a requestor. In FIG. 1 a network of distributed heterogeneous sensors (e.g., any of the following: a video or camera device 104, a radar device 106, and a LIDAR device 108) feed three processing groups: a sensor fusion group 110, an environment model group 112, and path computation group 114 shown serially linked. Each member of the processing groups may comprise one or more server instances that receive and process requests. In a particular processing group, the requests are processed in exactly the same order so that all server instances eventually arrive at the same state. Each of the processing groups includes interface software that virtually sits between the server instances. The software may provide a common application programming interface that replicates and orders the incoming requests to ensure each server instance receives the requests in the same order and accepts the results from each server instance that may arrive at different times. The software known as virtual synchrony middleware takes a predefined action when a client requests content from a group. The actions may include processing the content from each server instance and, when a majority of the server responses from a processing group are received, the actions compare the content and respond with the content that achieves a consensus or with the content that appears most often. The action selects the major statistical mode when the results render a multimodal distribution. An alternate action sends a selected response to the requesting client based on a selected item in a sequence, such as the first server response or third server response or the nth server response, for example, that the virtual synchrony middleware receives from the server instances while discarding the other responses.

In FIG. 1 the dark triangular elements are the initiators of the actions (they are the clients or the requestor components) and the shaded parallelogram elements connected to them (they are the servers or the responder components) are the elements executing the actions in response to the initiators. The lines that join the triangular elements and parallelogram elements represents any medium that support messaging or data flow including an in-vehicle bus such as a Controller Area Network (CAN) bus, a Local-Area Network (LAN), a backplane system, tracks between processors, or an internal transfer mechanism or bus between processing cores of a multicore processor or shared memory between two processes on the same microprocessor, for example.

The computation trigger 102 is a master clock that renders a clock signal based on a timing protocol such as a network time protocol that synchronizes the operation of the network data flow to a time reference. At time t=0 the computation trigger 102 activates the sensors 104-108. The sensors 104-108 take a real time sample of a detected and/or measured condition and store or buffer the sample. In other applications the sensors 104-108 read one or more pre-stored detections or conditions stored earlier in time from a local cache, a local buffer, or a remote memory device. Ten milliseconds later at t=10 ms, the computation trigger 102 activates the sensor fusion group 110 made up of sensor fusion instances acting as a group through LCLS that causes the sensor fusion group 110 to interrupt the sensors 104-108 and request the detected or measured conditions. The sensor fusion group 110 then fuses the data received from two or more of the heterogeneous sensors 104-108 to render a more accurate, more complete, and more dependable object list of the conditions that the sensors are monitoring. At t=20 ms the computation trigger 102 activates the environment model group 112 made up of environment model instances acting as a group through LCLS causing it to retrieve the object list from the sensor fusion group 110 and process the results through intelligent behavior models executed by the environment model group 112 acting through LCLS to render driving models and/or updates. Some driving models and/or updates provide a representation of a system and/or updated data that provides a vehicle with a self-driving capability at a safety level or standard. Some example environment model groups may model three driving levels, for example. The driving levels may include (1) maneuvering control (e.g., the control of the movement of the vehicle); (2) operational control (e.g., provide low level control of the vehicle); and (3) strategic level control (e.g., generally relates to route planning). The control levels may be modeled by one or more approaches including artificial-intelligence systems, rule-based models, state machine models, and/or probabilistic models, for example. The artificial-intelligence systems simulate the way in which a brain processes information, learns, and remembers and may include, for example, one or more neural networks. The systems may include interconnected processing elements, each with a limited number of inputs and an output. The processing elements "learn" by receiving weighted inputs that, with adjustment, time, and repetitive calculations, make driving decisions. Rule-based models may rely on knowledge bases, composed of rules, in making driving decisions. Each rule, or set of rules, indicates a certain action under certain conditions. State machine models may encode driving behavior into states that represented low-level driving sub-tasks and higher level driving actions, such as making turns in changing weather conditions, for example. Probabilistic models may base their decisions on empirical data that characterize different kinds of driving behavior in view of the randomness that occurs in driving environments.

At t=40 ms the computation trigger 102 activates the path computation group 114 made up of path computation instances acting as a group through LCLS that causes the path computation group 114 to request the driving models rendered by the environment model group 112. The path computation group 114 may generate a motion plan for a self-driving or autonomous vehicle that enables the self-driving or autonomous vehicle to move from its current location to a new location safely while avoiding collisions with fixed or moving obstacles and driving to the acceptable driving standards required by law, safety standards, and/or guidelines published by the insurance institute for highway safety, for example.

At t=50 ms the computation trigger 102 activates one or more of appropriate vehicle controls needed to implement the motion plans, such as some of vehicle controls 116-122 shown in FIG. 1 and further causes the selected vehicle controls to request the motion plans from the path computation group 114. One or more vehicle control plans are then generated. In non-critical operating conditions, or for backup, and/or for improved reliability, some or all of the vehicle controls may be replicated and operate in virtual synchrony and act as a group through LCLS. In alternate implementations, the vehicle controls are not replicated, not diversified, and do not operate in virtual synchrony. At t=60 ms the computation trigger 102 activates one or more of the vehicle actuators 124-130 that execute the vehicle control plans, which causes the one or more of the vehicle actuators 124-130 to request and execute the one or more vehicle control plans. The actuators 124-130 activate, control, or put into motion another mechanism or system such as a mechanical device. The mechanism or system may apply or release a vehicle's brakes, reduce or increase the vehicle's throttle, change the vehicle's gears, for example, or cause a self-driving vehicle to turn a corner, etc.

Figure 2:
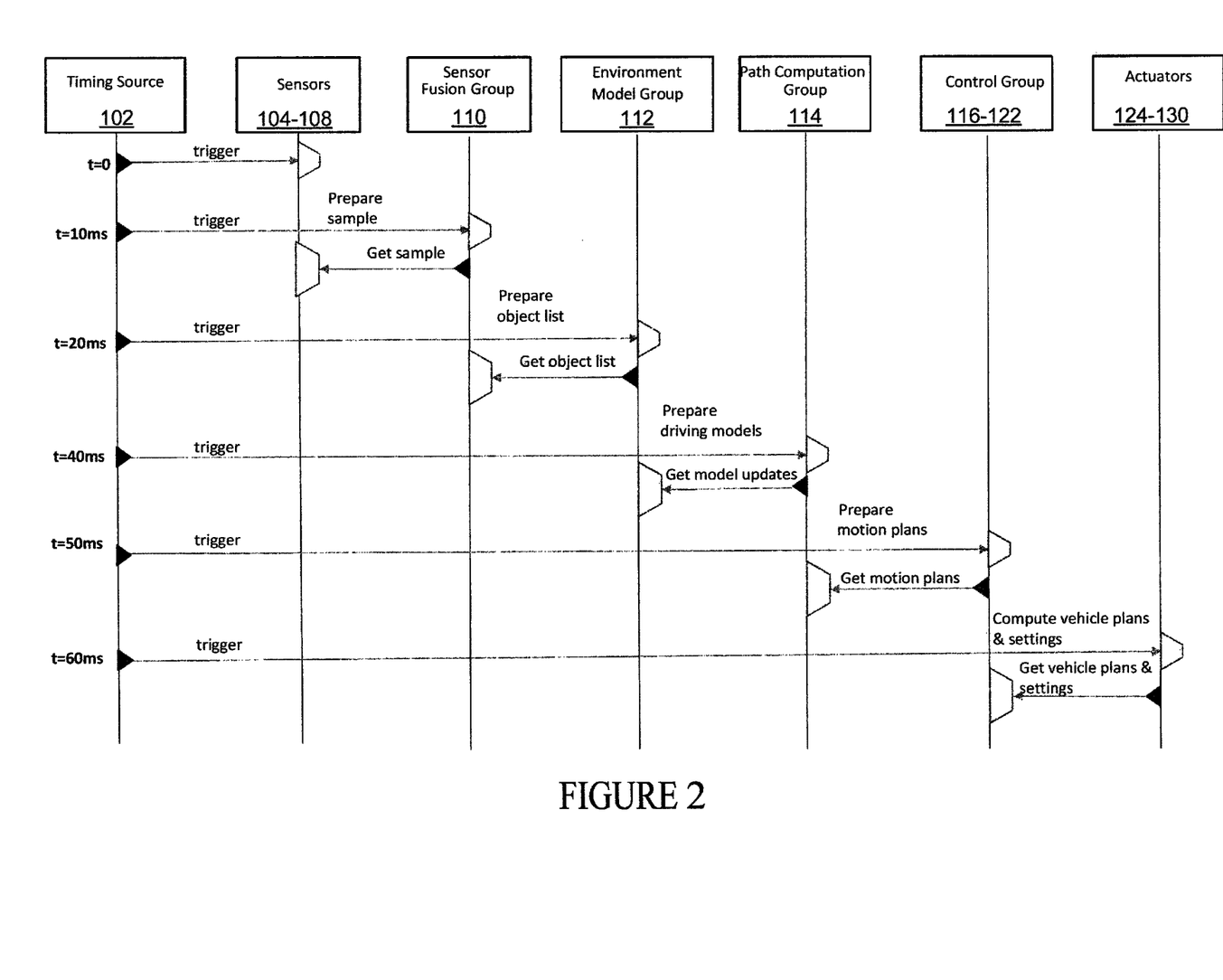
FIG. 2 shows data flow across the synchronous loosely-coupled lock-step chain architecture of FIG. 1.

FIG. 2 shows the data flow across the components of the synchronous loosely-coupled lock-step chain architecture of FIG. 1. The synchronization in the pull architecture of FIG. 2 ensures that the LCLS components remain in step; and the virtual synchrony middleware that sits virtually between group members arbitrates between the group member responses and generates content for the group without changing any instances of the group member's software. In FIG. 2, each of the group operations performs replicas or diverse calculations as part of its individual LCLS group. The results of the group operations may be pre-computed and buffered before a recipient node requests content. The predefined action that occurs before a request is received by the client node may be executed without client knowledge and may be delegated to a remote or local device.

In FIG. 2 the computation trigger 102 activates the sensors 104-108 at time t=0. The sensors 104-108 prepare a real time sample or read one or more pre-stored detections or conditions stored in a local or remote cache, memory or buffer. At t=10 ms, the computation trigger 102 activates the sensor fusion instances operating in virtual synchrony. The computation trigger 102 causes the sensor fusion group 110 to request the detected or measured conditions. The sensor fusion group 110 then prepares an object list by fusing the data received from the sensors 104-108. At t=20 ms the computation trigger 102 activates the environment model instances operating in virtual synchrony. The computation trigger causes the environment model group 112 to retrieve the object list from the sensor fusion group 110 and process the results through intelligent behavior models. Example intelligent behavior models are described above. At t=40 ms the computation trigger 102 activates the path computation instances operating in virtual synchrony. The computation trigger 102 causes the path computation group 114 to request the driving models or changes detected by the environment model group 112. The path computation group 114 may generate motion plans for a self-driving or autonomous vehicle that enable the self-driving or autonomous vehicle to move from its current location to a new location safely. At t=50 ms the computation trigger 102 activates one or more of selected vehicle controls that implement the motion plans, such as some of vehicle controls 116-122 shown in FIG. 1 and further causes the vehicle controls 116-122 to request the motion plans rendered by path computation group 114. One or more vehicle control plans or vehicle settings are then generated by the vehicle controls 116-122. At t=60 ms the computation trigger 102 activates one or more of the vehicle actuators 124-130 needed to execute the vehicle control plans or modify the vehicle settings, which causes the one or more of the vehicle actuators 124-130 to request and execute the vehicle control plans or vehicle settings that are rendered by the control group. The actuators 124-130 activate, control, or put into motion another mechanism or system such as a mechanical device. The mechanism or system may apply or release a vehicle's brakes, reduce or increase the vehicle's throttle, change the vehicle's gears, for example, or cause a self-driving vehicle to turn a corner, etc.

Figure 3:
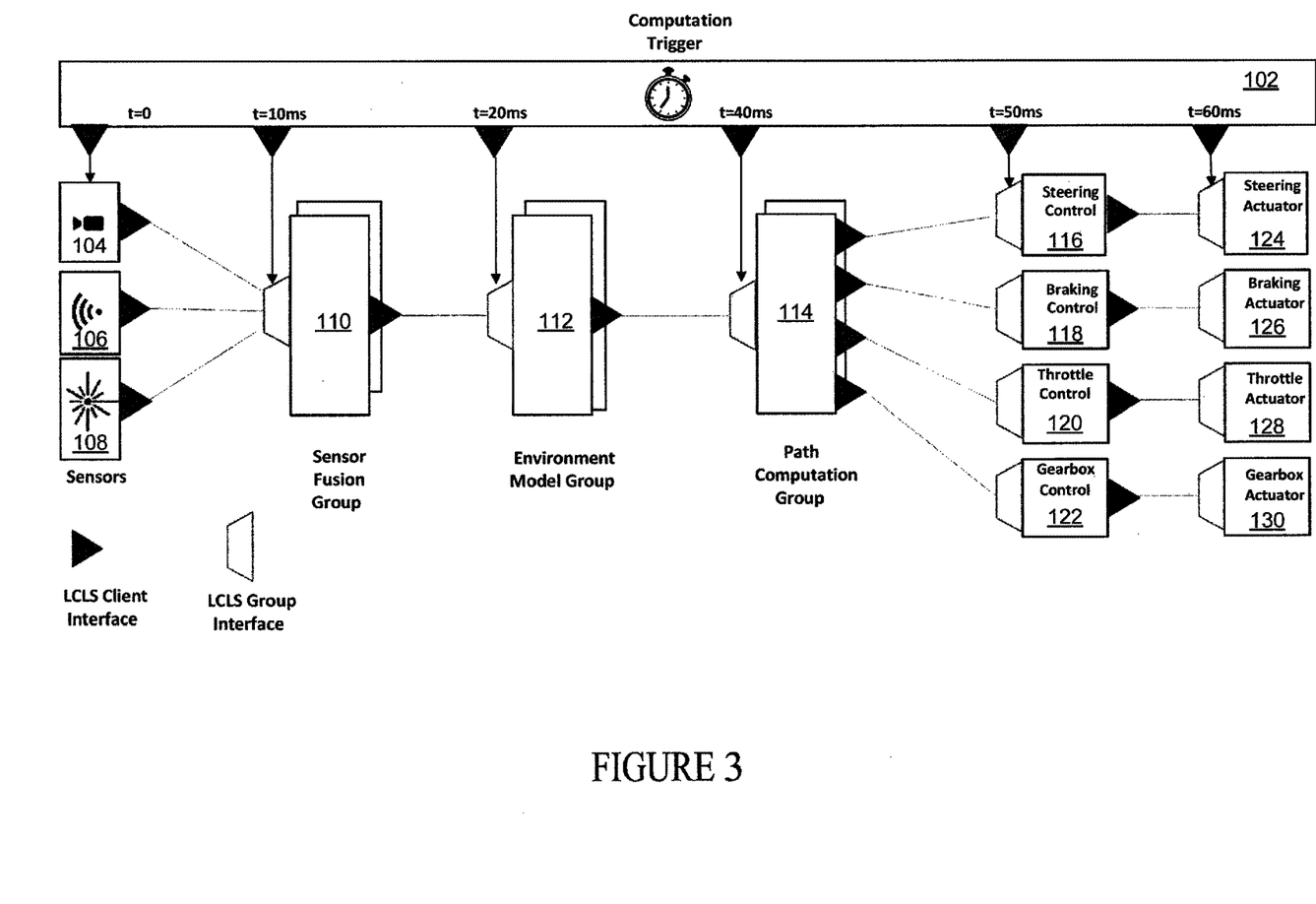
FIG. 3 is a synchronous loosely-coupled lock-step chain architecture that is data driven.

FIG. 3 is a synchronous loosely-coupled lock-step chain that is data driven. In this implementation the requestor nodes (represented by the triangular elements) identify that they have data or content to be transmitted to the responder node or nodes (represented by the shaded parallelograms). The requestor nodes will then send content without receiving a request from the responder nodes. So, instead of pulling or querying information periodically on the chance that the data changed, updates or new data sets are transmitted out proactively as needed. The flexibility of the synchronous push architecture gives the clients the authority to determine when to send, publish, or multicast data. Some clients might choose to send data when a vehicle is traversing critical operating conditions; other clients may choose to skip a push update altogether when the vehicle is traversing routine or non-critical operating conditions.

In FIG. 3 the network of distributed heterogeneous sensors (e.g., any of the following: a video or camera device 104, a radar device 106, and a LIDAR device 108) feed the three processing groups serially linked: the sensor fusion group 110, the environment model group 112, and path computation group 114. Each of the processing groups may comprise one or more server instances that process the data it receives. In a particular processing group, the data are processed in exactly the same order so that all server instances eventually arrive at the same state. So, when a member of a group, for example, such as a member of the sensor fusion group 110 receives two messages (or data) from any clients, each member of the sensor fusion group 110 must receive the same two messages (or data) in exactly that same order. Like the synchronous pull architecture described above, the processing groups of the synchronous push architecture include or interface software or virtual synchrony middleware that sits virtually between the server instances. The software provides a common application programming interface that accepts the results from each server instance that may arrive at different times. The software or virtual synchrony middleware takes a predefined action when the server instance sends the content to the receiving (responder) node. Example actions are described above.

In FIG. 3 the dark triangular elements are the initiators of the actions or requestor nodes and the shaded parallelogram elements connected to them are the recipient elements or responder nodes. The lines that join the triangular elements and parallelogram elements represent any medium that supports messaging or data flow as described above. At time t=0 the computation trigger 102 activates the sensors 104-108. The sensors 104-108 take a real time sample of a detected and/or measured condition and store or buffer the sample. In other applications the sensors 104-108 read one or more pre-stored detections or conditions stored earlier in time from a local cache, a local buffer, or a remote memory device. At t=10 ms, the computation trigger 102 activates the sensor fusion group 110 made up of the sensor fusion instances acting as a group through LCLS. The sensor fusion group 110 processes the detected or measured conditions as described above if the sensors 104-108 sent the detected or measured conditions to the sensor fusion group 110. In both the synchronous push and the asynchronous architectures, the sending nodes determine whether to send content regardless of any request received from the recipient node. In the synchronous push architecture, content is published or transmitted on each clock cycle; here, that is every 10 ms; in alternate synchronous push and pull implementations it occurs at any other predetermined periodic time intervals.

At t=20 ms the computation trigger 102 activates the environment model group 112 made up of environment model instances acting as a group through LCLS. The environment model group 112 processes the object list of fused data as described above if the sensor fusion group 110 sent the object list to the environment model group 112. At t=40 ms the computation trigger 102 activates the path computation group 114 made up of path computation instances acting as a group through LCLS. The path computation group 114 processes the driving models and/or updates described above if the environment model group 112 sent the driving models and/or updates to the path computation group 114. At t=50 ms the computation trigger 102 activates one or more of the selected vehicle controls needed to implement the motion plans, such as some of vehicle controls 116-122 shown in FIG. 3. The vehicle controls process the motion plans as described above if the path computation group 114 sent the motion plans to one or more of the vehicle controls 116-122. At t=60 ms the computation trigger 102 activates one or more of the vehicle actuators 124-130 that execute the vehicle control. The selected vehicle actuators execute the vehicle control if the vehicle controls 116-122 sent the vehicle control plans to the one or more of the vehicle actuators 124-130.

Figure 4:
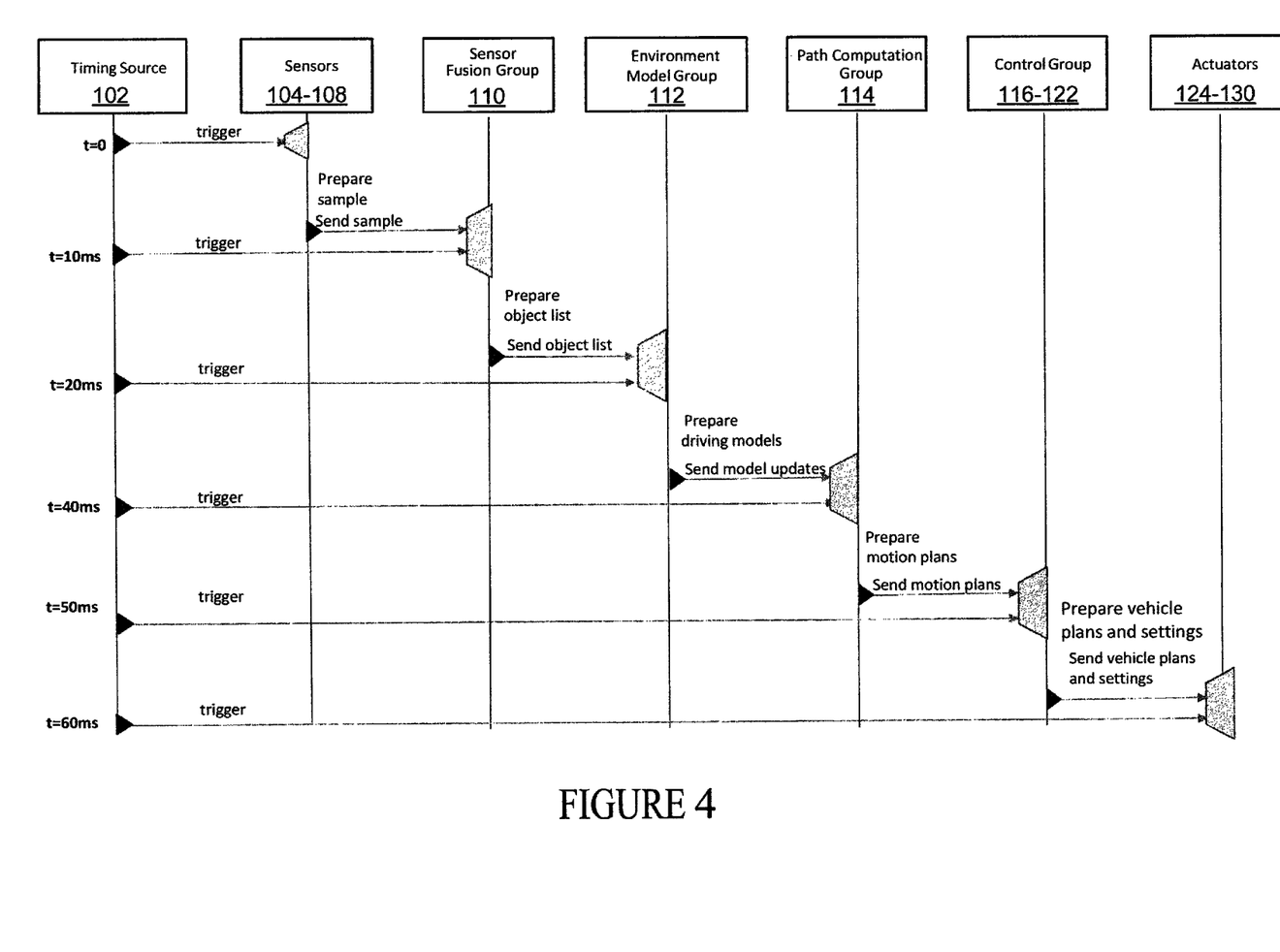
FIG. 4 shows data flow across the synchronous loosely-coupled lock-step chain architecture of FIG. 3

FIG. 4 shows the data flow across the components of the synchronous loosely-coupled lock-step chain architecture of FIG. 3 that is data driven. The synchronization in the push architecture of FIG. 3 ensures that the LCLS components remain in step; and the virtual synchrony middleware that sits virtually between group members and interfaces them arbitrates between the group member responses and generates content for the group without changing any of instances of group member software. In FIG. 4, each of the group operations perform replicas or diverse calculations as part of its individual LCLS group. The results of the group operations may be pre-computed, buffered, and compared before a recipient or downstream node receives content. The predefined action that occurs before data is transmitted or multicast to a responder node may be executed without responder node knowledge and may be delegated to a remote or local software or a device.

In FIG. 4 the computation trigger 102 activates the sensors 104-108. The sensors 104-108 prepare and store a real time sample of a detected and/or measured condition. At t=10 ms, the computation trigger 102 activates the sensor fusion group 110, which prepares an object list by fusing the data received from the sensors if the sensors 104-108 transmitted the detected or measured conditions to sensor fusion group 110. At t=20 ms the computation trigger 102 activates the environment model group 112 which processes the object list if the sensor fusion group 110 transmitted the object list to the environment model group 112. At t=40 ms the computation trigger 102 activates the path computation group 114, which processes the driving models and/or updates if the environment model group 112 transmitted driving models to the path computation group 114. At t=50 ms the computation trigger 102 activates one or more of the selected vehicle controls to implement the motion plans rendered by the environment model group 112. The vehicle controls processes the motion plans if the path computation group 114 transmitted the motion plans to the vehicle controls 116-122. At t=60 ms the computation trigger 102 activates one or more of the vehicle actuators 124-130 that execute the vehicle control plans rendered by the vehicle controls 116-122. The selected vehicle actuators execute the vehicle control plans if the vehicle controls 116-122 transmitted the vehicle control plans to the one or more of the vehicle actuators 124-130. The actuators 124-130 activate, control, or put into motion another mechanism or system such as a mechanical device.

Figure 5:
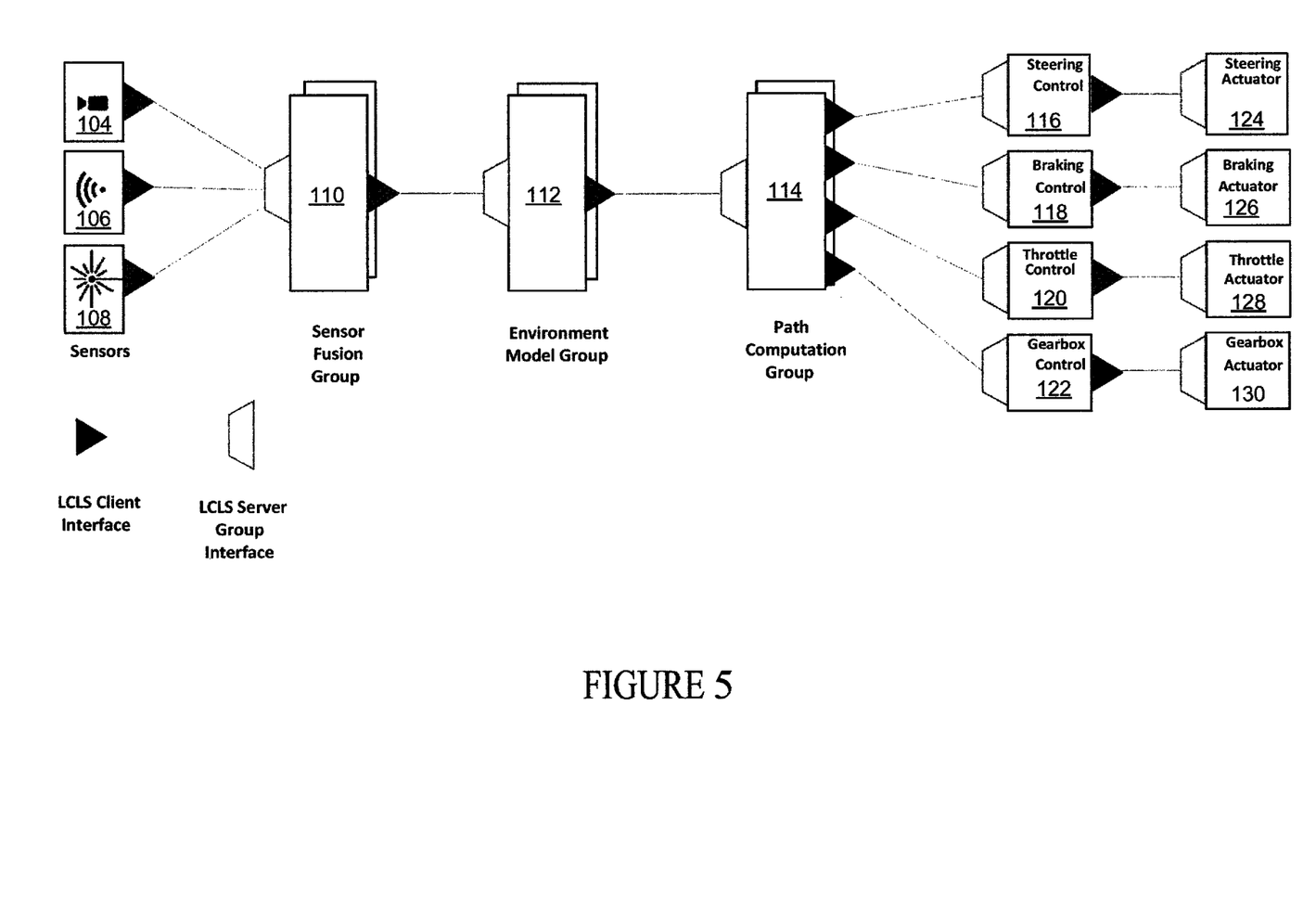
FIG. 5 is an asynchronous loosely-coupled lock-step chain architecture.

FIG. 5 shows an asynchronous loosely-coupled lock-step chain architecture. The asynchronous architecture has an operating speed not related to any fixed or specific speed or periodic clock signal of the system. It does not require a computation trigger 102 or a clock signal. Since no fixed period or interval timing signals are used, the processing of a next event occurs when the processing of a previous event or an operation has been completed. This architecture, like some of the synchronous loosely-coupled lock-step chain architectures that are data driven shown in FIG. 3, uses intelligent sensors that perform a number of intelligent functions as part of their task including decisions concerning when to monitor conditions and send sensor content to a downstream node or nodes. Each of three processing groups: the sensor fusion group 110, the environment model group 112, and the path computation group 114 and the vehicle controls 116-122 may also include custom agents or intelligent agents to determine when content should be published or transmitted to the next downstream node or nodes. Generally, a custom agent is explicitly pre-configured prior to the operation of the vehicle and does not change, whereas an intelligent agent configures itself or adapts to changing operating conditions based on vehicle operation and vehicle and/or system operating history. The intelligent agents may be rule-based and evaluative, and/or execute neural networks, etc., for example.

Like the synchronous loosely-coupled lock-step chain architecture of FIG. 3, the asynchronous loosely-coupled lock-step chain architecture of FIG. 5 is data or event driven. The network of distributed heterogeneous sensors (e.g., any of the following: a video or camera device 104, a radar device 106, and a LIDAR device 108) feed the three processing groups when it determines it has sensor content to send to the sensor fusion group 110. The sensor fusion group 110, the environment model group 112, and path computation group 114 groups may include one or more server instance that process the data it receives. Like the architectures described above, the data are processed in exactly the same order. Like the synchronous push architecture described, the processing groups of the asynchronous push architecture include or interface to software or virtual synchrony middleware that sits virtually between and interfaces to the server instances. The software provides the common application programming interface that accepts the results from each server instance that may arrive at different times. The software or virtual synchrony middleware takes a predefined action when the server instance sends the content to the receiving (responder) node. Those actions may include the example actions described above. However, some implementations differ because the virtual synchrony middleware interfaces and communicates with the custom and/or intelligent agents to determine when a group or a vehicle control has content to be transmitted to a downstream node or nodes.

When an event occurs such as a significant change in state or a predetermined condition occurs, the sensors 104-108 take a real time sample of a detected and/or measured condition and store the real time sample. Some sensors may read one or more pre-stored detections or conditions stored earlier in time from a local cache, buffer or remote memory. When a sensor 104-108 determines it has content to send, the sensor content is transmitted to the sensor fusion group 110 made up of the sensor fusion instances acting as a group through LCLS. The sensor fusion group 110 processes the detected or measured conditions in response to the detected or measured conditions received and renders an object list of fused data. Once the sensor fusion group 110 determines it has content to send, the object list of fused data is transmitted to the environment model group 112 made up of environment model instances operating via LCLS. The environment model group 112 processes the object list of fused data in response to the object list of fused data it receives and renders driving models and/or updates. When the environment model group 112 determines it has content to send, the driving models and/or updates are transmitted to the path computation group 114 made up of path computation instances operating through LCLS. The path computation group 114 processes the driving models and/or updates in response to the driving models and/or updates it receives and renders the motion plans. When the path computation group 114 determines it has content to send, the motion plans are transmitted to the one or more vehicle controls 116-122, which process the motion plans and render the vehicle control plans. When the one or more vehicle controls determines it has content to send, the vehicle control plans are transmitted to the vehicle actuators 124-130.

Figure 6:
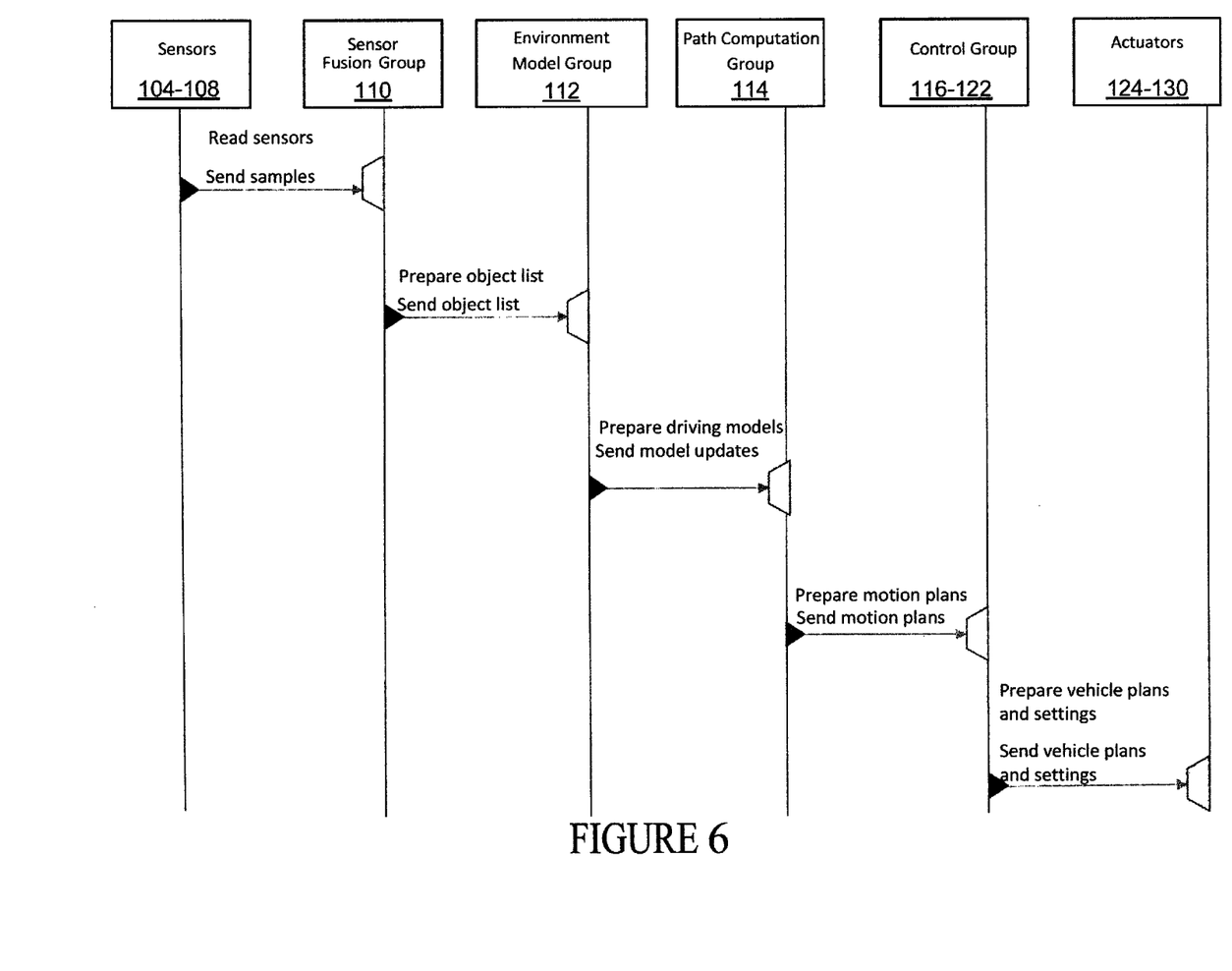
FIG. 6 shows data flow across the components of the asynchronous loosely-coupled lock-step chain architecture of FIG. 5.

FIG. 6 shows the data flow across the components of the asynchronous loosely-coupled lock-step chain architecture. In FIG. 6, each of the group operations perform replica or diverse calculations as part of its individual LCLS group. The results of the group operations may be pre-computed, buffered, and compared before a recipient or downstream node receives content. The predefined action that occurs before data are transmitted or multicast to a responder node may be delegated to remote or local software or a device.

In FIG. 6 the sensors 104-108 take a real time sample of a detected and/or measured condition and store the real time sample when an event occurs. Some sensors read one or more pre-stored detections or conditions stored earlier in time from a local cache, buffer or remote memory. When the sensors 104-108 identify content to send, the sensor content is transmitted to the sensor fusion group 110 made up of the sensor fusion instances operating through LCLS. The sensor fusion group 110 processes the detected or measured conditions in response to the detected or measured conditions it receives and renders an object list of fused data. When the sensor fusion group 110 identifies content to send, the object list of fused data is transmitted to the environment model group 112 made up of environment model instances operating via LCLS. The environment model group 112 processes the object list of fused data in response to the object list of fused data it receives and renders driving models and/or updates. When the environment model group 112 identifies content to send, the driving models and/or updates are transmitted to the path computation group 114 made up of path computation instances operating through LCLS. The path computation group 114 processes the driving models and/or updates in response to the driving models and/or updates it receives and renders the motion plans. When the path computation group 114 identifies content to send, the motion plans are transmitted to the one or more vehicle controls 116-122, which processes the motion plans and renders the vehicle control plans. When the one or more vehicle controls identifies content to send, the vehicle controls plans are transmitted to the vehicle actuators 124-130. The actuators 124-130 activate, control, or put into motion another mechanism or system such as a mechanical device. The mechanism or system may apply or release a vehicle's brakes, reduce or increase the vehicle's throttle, change the vehicle's gears, for example, or cause a self-driving vehicle to turn a corner, etc.

While each of the systems, engines, methods, and descriptions described may be encompassed within other systems and applications they also may stand alone. Other alternate systems may include any combinations of structure and functions described above or shown in one or more or each of the figures including more or fewer sensors, more or fewer groups, more or fewer controllers and/or more or fewer actuators. These systems or methods are formed from any combination of more or fewer structures and functions shown and/or described. The structures and functions may process more, less, or different input. The architectures may be embedded or used in many systems such as in a dispenser or a vending machine, a control room (e.g., a nuclear power station control room) or systems that relates to health or safety such as a medical system. In a medical system, for example, the group members, controllers, and actuators may control drug flow in response to sensors that monitor a patient's health or state.

In some architectures, the elements, systems, processes, algorithms and descriptions described herein may be encoded in a non-transitory signal bearing storage medium, a computer-readable medium, or may include logic stored in a memory that may be accessible through an interface. Some signal-bearing storage medium or computer-readable medium comprise a memory that is unitary or separate (e.g., local or remote) part of the vehicle or a device. If the descriptions described herein are performed by software, the software may reside in a memory resident to or interfaced to the one or more processors or multicore processors. The LCLS architecture makes use of replication and diversification in a distributed environment that can be run on multiple processors some or all of which may be safety certified. Any of the systems or data flows described may be used with all, some, or any of the systems and methods disclosed in U.S. patent application Ser. No. 15/280,717, titled "Software Handling of Hardware Errors", which is herein incorporated by reference. The LCLS architecture supports requestor and responder components in a self-supporting distributed network. The systems and methods described are self-adaptive and extensive and evolve with the standards as the standards evolve overtime. As such, references to any standards include the current and future versions of those standards, any related standards of the current and future versions, and any superseding standards.

The memory or storage disclosed may retain an ordered listing of executable instructions for implementing the functions described above. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. Generally, when messages, are said to be "responsive to" or occur "in response to" a function, the messages necessarily occur as a result of that function. It is not sufficient that a message merely follow or occur subsequent to that function, a causal ordering is necessary.

The disclosed architecture allows the level of resiliency required for a particular subsystem to be programmed or actuated in response to the software's own control and can be modified or actuated dynamically during the system's or embedded system's operation in the operating environment or state of the system. The level of resiliency may establish the number of group member replicas that are activated and their activation times or periods, the number of responses required before a response is accepted and acted upon via the virtual synchrony middleware, and the number of diverse implementations required.

This disclosure provides a loosely-coupled locked-step chain (LCLS) architecture that is reliable, scalable, and available when needed. The architecture supports data driven, demand driven, and/or hybrid data flows that can be used in standalone and embedded systems. Embedded systems are those systems that are integral to or a unitary part of another system or process, such as a medical device, or a nuclear power station, or a vehicle, for example. A vehicle may comprise, without limitation, a car, bus, truck, tractor, motorcycle, bicycle, tricycle, quadricycle, or other cycle, ship, submarine, hoverboard, boat or other watercraft, helicopter, drone, airplane or other aircraft, train, tram or other railed vehicle, spaceplane or other spacecraft, and any other type of vehicle whether currently existing or after-arising this disclosure. In other words, it comprises a device or structure for transporting persons or things.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A loosely-coupled lock-step computing system comprising:
    a plurality of sensors that detect or measure a physical property;
    a plurality of server groups communicatively coupled to the plurality of sensors, wherein each server group is serially linked to another server group and comprises a plurality of server instances operating in virtual synchrony; and
    a virtual synchrony middleware communicatively coupled to each of the server groups, wherein the virtual synchrony middleware receives a plurality of outputs from the plurality of server instances when operating with one of the server groups and renders a single reply based on the plurality of outputs;
    wherein the virtual synchrony middleware replicates and orders incoming requests to the server groups to ensure that each of the server instances of that server group receives the same incoming requests in the same order.

2. The system of claim 1 further comprising a plurality of actuators responsible for actuating a mechanical device in response to the single reply.

3. The system of claim 1 further comprising a computation trigger that renders a clock signal that synchronizes the loosely-coupled lock-step computing system to a periodic interval.

4. The system of claim 3 wherein each of the server groups is configured to process messages in response to a request from a recipient node and the clock signal.

5. The system of claim 3 wherein a server group comprises an intelligent agent and the server group is configured to transmit a reply in response to the clock signal when the intelligent agent determines that the server group has content to transmit to a recipient node.

6. The system of claim 1 wherein a server group comprises an intelligent agent and the server group is configured to transmit a reply in response to a clock signal and an intelligent agent's determination that the server group has content to transmit to a recipient node.

7. The system of claim 1 wherein each of the server groups transmits replies unrelated to and not based on a clock signal.

8. The system of claim 1 wherein the plurality of server groups renders driving models and motion plans.

9. A non-transitory machine-readable medium encoded with machine-executable instructions, wherein execution of the machine-executable instructions is for:
    detecting or measuring a physical property;
    processing the detection or measurement of the physical property through a plurality of server groups, wherein each server group is serially linked to another server group and comprises a plurality of server instances operating in virtual synchrony; and
    executing a virtual synchrony middleware that receives a plurality of outputs from the plurality of server instances when operating with one of the server groups and renders a single reply based on the plurality of outputs;
    wherein the virtual synchrony middleware replicates and orders incoming requests to the server groups to ensure that each of the server instances of that server group receives the same incoming requests in the same order.

10. The non-transitory machine-readable medium of claim 9 further comprising a machine-readable medium encoded with machine-executable instructions for generating a plurality of actuators responsible for actuating a mechanical device in response to the single reply.

11. The non-transitory machine-readable medium of claim 9 further comprising machine-readable medium encoded with machine-executable instructions for generating a computation trigger that renders a clock signal that synchronizes a loosely-coupled lock-step computing system to a periodic interval.

12. The non-transitory machine-readable medium of claim 11 wherein each of the server groups is configured to process messages in response to a request from a recipient node and the clock signal.

13. The non-transitory machine-readable medium of claim 11 wherein a server group comprises an intelligent agent and the server group is configured to transmit a reply in response to a clock signal when the intelligent agent determines that the server group has content to transmit to a recipient node.

14. The non-transitory machine-readable medium of claim 9 wherein a server group comprises an intelligent agent and the server group is configured to transmit a reply in response to a clock signal and an intelligent agent's determination that the server group has content to transmit to a recipient node.

15. The non-transitory machine-readable medium of claim 9 wherein each of the server groups transmits replies unrelated to and not based on a clock signal.

16. The non-transitory machine-readable medium of claim 9 wherein the plurality of server groups renders driving models and motion plans.

17. A method of processing in a loosely-coupled lock-step computing system comprising:
    detecting or measuring a physical property;
    processing the detection or measurement of the physical property through a plurality of server groups, wherein each server group is serially linked to another server group and comprises a plurality of server instances operating in virtual synchrony; and
    executing a virtual synchrony middleware that receives a plurality of outputs from the plurality of server instances when operating with one of the server groups and renders a single reply based on the plurality of outputs;

wherein the virtual synchrony middleware replicates and orders incoming requests to the server groups to ensure that each of the server instances of that server group receives the same incoming requests in the same order.

18. The method of claim 17 further comprising generating a plurality of actuators responsible for actuating a mechanical device in response to the single reply.

19. The method of claim 17 further comprising generating a computation trigger that renders a clock signal that synchronizes the loosely-coupled lock-step computing system to a periodic interval.

20. The method of claim of claim 19 wherein each of the server groups is configured to process messages in response to a request from a recipient node and the clock signal.

21. The method of claim of claim 19 wherein a server group comprises an intelligent agent and the server group is configured to transmit a reply in response to a clock signal when the intelligent agent determines that the server group has content to transmit to a recipient node.

22. The method of claim 17 wherein a server group comprises an intelligent agent and the server group is configured to transmit a reply in response to a clock signal and an intelligent agent's determination that the server group has content to transmit to a recipient node.

23. The method of claim 17 wherein each of the server groups transmits replies unrelated to and not based on a clock signal.

24. The method of claim 17 wherein the plurality of server groups renders driving models and motion plans.

25. A vehicle comprising:
a plurality of sensors that detect or measure a vehicle state;
a plurality of actuators that activate or control another mechanism in the vehicle;
a plurality of server groups communicatively coupled to the plurality of sensors and the plurality of actuators, wherein each server group is serially linked to another server group and comprises a plurality of server instances operating in virtual synchrony; and
a virtual synchrony middleware communicatively coupled to each of the server groups, the virtual synchrony middleware receives a plurality of outputs from the plurality of server instances when operating with one of server groups and renders a single reply based on the plurality of outputs;
wherein the virtual synchrony middleware replicates and orders incoming requests to the server groups to ensure that each of the server instances of that server group receives the same incoming requests in the same order.

* * * * *